(12) United States Patent
McPherson (10) Patent No.: US 8,038,133 B2
(45) Date of Patent: Oct. 18, 2011

(54) COAXIAL TUBE DAMPER

(76) Inventor: Mathew A. McPherson, Norwalk, WI (US)

( * ) Notice: Subject to any disclaimer, the term of this patent is extended or adjusted under 35 U.S.C. 154(b) by 629 days.

(21) Appl. No.: 11/855,047

(22) Filed: Sep. 13, 2007

(65) Prior Publication Data

US 2009/0072455 A1 Mar. 19, 2009

(51) Int. Cl.
*B60G 13/00* (2006.01)
*B25G 3/00* (2006.01)
(52) U.S. Cl. .................. 267/140.4; 173/162.2
(58) Field of Classification Search .................. 267/134, 267/136, 137, 139, 196, 201, 140.4; 428/593; 473/523; 173/162.2
See application file for complete search history.

(56) References Cited

U.S. PATENT DOCUMENTS

| | | | | |
|---|---|---|---|---|
| 2,928,444 A | 3/1960 | Ivins | | 81/22 |
| 3,232,597 A | * 2/1966 | Gaydecki | | 267/219 |
| 3,489,052 A | 1/1970 | Colyer et al. | | 84/422 |
| 3,674,267 A | 7/1972 | Hollis | | 473/552 |
| 4,109,404 A | 8/1978 | Preeschl | | 43/17 |
| 4,240,479 A | 12/1980 | Schleffendorf | | 145/61 |
| 4,276,947 A | 7/1981 | Hebel | | 175/321 |
| 4,623,049 A | 11/1986 | Warren | | 188/281 |
| 4,645,044 A | 2/1987 | Kato et al. | | 188/319 |
| 4,691,926 A | 9/1987 | Adam | | 472/552 |
| 4,697,481 A | 10/1987 | Maeda | | 81/22 |
| 4,907,810 A | 3/1990 | Whiteford | | 273/73 |
| 4,927,143 A | 5/1990 | Hillock | | 473/522 |
| 4,948,131 A | 8/1990 | Nakanishi | | 473/521 |
| 5,004,215 A | 4/1991 | Aubry et al. | | 267/140.1 |
| 5,052,500 A | * 10/1991 | Ohtsu | | 173/162.2 |
| 5,087,491 A | 2/1992 | Barrett | | 428/34.5 |
| 5,088,734 A | 2/1992 | Glava | | 273/73 |
| 5,180,039 A | 1/1993 | Axthammer et al. | | 188/299 |
| 5,180,147 A | 1/1993 | Andersson et al. | | 267/136 |
| 5,211,669 A | 5/1993 | Bonnes et al. | | 16/110 |
| 5,253,544 A | 10/1993 | Allsop et al. | | 74/551.1 |
| 5,256,969 A | 10/1993 | Miyajima et al. | | 324/318 |
| 5,257,680 A | * 11/1993 | Corcoran et al. | | 188/129 |
| 5,269,516 A | 12/1993 | Janes | | 273/73 |
| 5,273,022 A | 12/1993 | Leuen | | 124/89 |
| 5,285,697 A | 2/1994 | Clausen | | 74/551.2 |
| 5,295,684 A | 3/1994 | Bracho | | 273/73 |
| 5,441,132 A | 8/1995 | Pradel et al. | | 188/315 |
| 5,454,573 A | * 10/1995 | Nijland | | 277/606 |
| 5,491,390 A | 2/1996 | McGreen | | 318/5 |
| 5,511,444 A | 4/1996 | Clausen et al. | | 74/551.2 |
| 5,655,980 A | 8/1997 | Nashif et al. | | 473/520 |
| 5,669,835 A | 9/1997 | Tiura | | 473/550 |
| 5,690,566 A | 11/1997 | Bracho | | 473/549 |
| 5,704,259 A | 1/1998 | Riehle | | 81/22 |
| 5,857,694 A | 1/1999 | Lazarus et al. | | |
| 5,931,748 A | * 8/1999 | Hsieh | | 473/523 |
| 5,944,617 A | * 8/1999 | Falone et al. | | 473/300 |
| 5,964,672 A | 10/1999 | Bianchi | | 473/521 |
| 6,007,439 A | 12/1999 | MacKay, Jr. | | 473/520 |
| 6,026,910 A | * 2/2000 | Masterson et al. | | 173/162.2 |
| 6,070,301 A | 6/2000 | Fallandy | | 16/431 |
| 6,117,028 A | 9/2000 | You | | 473/520 |
| 6,149,475 A | * 11/2000 | Tasaka et al. | | 440/52 |

(Continued)

*Primary Examiner* — Christopher Schwartz (74) *Attorney, Agent, or Firm* — Vidas, Arrett & Steinkraus, P.A.

(57) ABSTRACT

A vibrating device has at least one dampening portion. The dampening portion comprises a first tube, a second tube and a layer of resilient material configured so that the first tube is disposed about the second tube, and the layer of resilient material is positioned between the first and second tubes.

22 Claims, 7 Drawing Sheets

U.S. PATENT DOCUMENTS

| | | | | |
|---|---|---|---|---|
| 6,149,538 | A | 11/2000 | Tiura | 473/550 |
| 6,182,301 | B1 | 2/2001 | Krueger et al. | 4/248 |
| 6,240,642 | B1 | 6/2001 | Templeton | 30/125 |
| 6,247,687 | B1 * | 6/2001 | Jensen et al. | 267/200 |
| 6,257,220 | B1 | 7/2001 | McPherson | 124/89 |
| 6,382,201 | B1 | 5/2002 | McPherson et al. | 124/89 |
| 6,499,187 | B2 | 12/2002 | Hollingsworth | 16/114.1 |
| 6,548,007 | B1 | 4/2003 | Deloris et al. | 264/293 |
| 6,668,681 | B2 | 12/2003 | Flum et al. | 74/551.1 |
| 6,687,955 | B2 | 2/2004 | Hollingsworth | 16/114.1 |
| 6,709,352 | B1 | 3/2004 | Albin | 473/520 |
| 6,763,747 | B1 | 7/2004 | Gierer et al. | 81/489 |
| 6,837,345 | B1 * | 1/2005 | Lauble et al. | 188/378 |
| 6,978,643 | B2 | 12/2005 | Akers et al. | 66/170 |
| 6,989,197 | B2 | 1/2006 | Schneider | 428/416 |
| 7,055,276 | B2 | 6/2006 | McPherson | 42/1.06 |
| 7,578,465 | B2 * | 8/2009 | Bachmeyer et al. | 244/100 R |
| 2002/0006523 | A1 * | 1/2002 | Obeshaw | 428/593 |
| 2003/0226421 | A1 * | 12/2003 | Livingston | 74/551.1 |
| 2003/0229970 | A1 * | 12/2003 | Chen | 16/430 |
| 2005/0279598 | A1 | 12/2005 | McPherson | 188/378 |
| 2005/0279599 | A1 * | 12/2005 | McPherson | 188/379 |
| 2007/0267924 | A1 * | 11/2007 | Dellinger | 310/51 |

* cited by examiner

COAXIAL TUBE DAMPER

FIELD OF THE INVENTION

This invention relates to dampening the vibrations felt by the user of devices such as bicycles, motorcycles, all terrain vehicles, personal watercrafts, lawn mowers, snowblowers, hedge trimmers, chain saws, blowers, jack hammers, axes, hammers, tennis rackets and the like. At least one region of the device is constructed and arranged to reduce the vibrations felt by the user of a vibrating device.

BACKGROUND OF THE INVENTION

Many recreational and work devices transmit vibrations to the user. Most of the time, the majority of vibrations are transmitted to the user's hands and arms when they are holding the device. These vibrations can cause fatigue and discomfort during use and, in some cases, prolonged use of these devices can cause pain or injury to the user. Therefore, it is desirable to reduce the amount of vibrations transmitted to the user.

U.S. Pat. Nos. 6,257,220 and 6,382,301 to McPherson et al. discuss vibration dampers as applied to archery bows, and are incorporated herein by reference in their entirety. U.S. Pat. No. 7,055,276 to McPherson discusses vibration dampers as applied to firearms, and is incorporated herein by reference in its entirety. U.S. Patent Application Publication 2005/0279599 to McPherson discusses vibration dampers as applied to handheld devices, and is incorporated herein by reference in its entirety. U.S. Patent Application Publication 2005/0279598 to McPherson discusses vibration dampers as applied to motorized devices, and is incorporated herein by reference in its entirety.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

BRIEF SUMMARY OF THE INVENTION

In at least one embodiment, at least one portion of a device that transmits vibrations during use has a dampening portion that reduces the amount of vibrations felt by the user of the device. A dampening portion comprises a first tube, a second tube and at least one section of resilient material positioned between the first and second tubes.

In some embodiments, the first tube attaches to a body of a device and the second tube comprises a handle for the device.

The invention is also directed towards methods of making the dampening portion.

BRIEF DESCRIPTION OF THE SEVERAL VIEWS OF THE DRAWING(S)

A detailed description of the invention is hereafter described with specific reference being made to the drawings.

DETAILED DESCRIPTION OF THE INVENTION

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

The invention is directed to devices 8 that are subject to vibration during use and have at least one dampening portion 12. Examples of devices 8 that are subject to vibration during use, include, but are not limited to, bicycles, motorcycles, all terrain vehicles, personal watercrafts, lawn mowers, snowblowers, hedge trimmers, chain saws, blowers, jack hammers, axes, hammers, sport rackets for tennis and squash, and the like. Other devices 8 which can have at least one dampening portion 12 are discussed in U.S. Pat. Nos. 6,257,220; 6,382,301; 7,055,276; U.S. Patent Application Publications 2005/0279599 and 2005/0279598.

A dampening portion 12 is a portion of the device 8 that has been constructed and arranged to minimize transmission of the vibrations of a device 8, such as a bicycle, to the user. In some embodiments, dampening portions 12 comprise a first tubular member 14, a second tubular member 15 and at least one section of resilient material 18. The first and second tubular members 14, 16 are coaxially aligned and the section (s) of resilient material 18 are positioned between the first and second tubular members 14, 16. Thus, the section(s) of resilient material 18 are engaged to the interior surface of one tube 14 or 16, and the exterior surface of the other tube, 14 or 16. In some embodiments, the first tubular member 14 is attached to the second tubular member 16 only via the resilient material 18. Thus, in some embodiments, there is no direct contact between the tubular members 14, 16.

The tubular members 14, 16 may also be referred to herein as tubes. In some embodiments, at least one of the first and second tubular members 14, 16 extends continuously around a central axis (e.g. the longitudinal axis of the dampening portion 12, represented by line 5-5 in FIG. 1) and comprises a closed cross-section. In some embodiments, at least one of the first and second tubes 14, 16 extends around a portion of a central axis and comprises an unclosed cross-section. For example, in some embodiments, a tube can be formed with a longitudinal slit.

Figure 10:
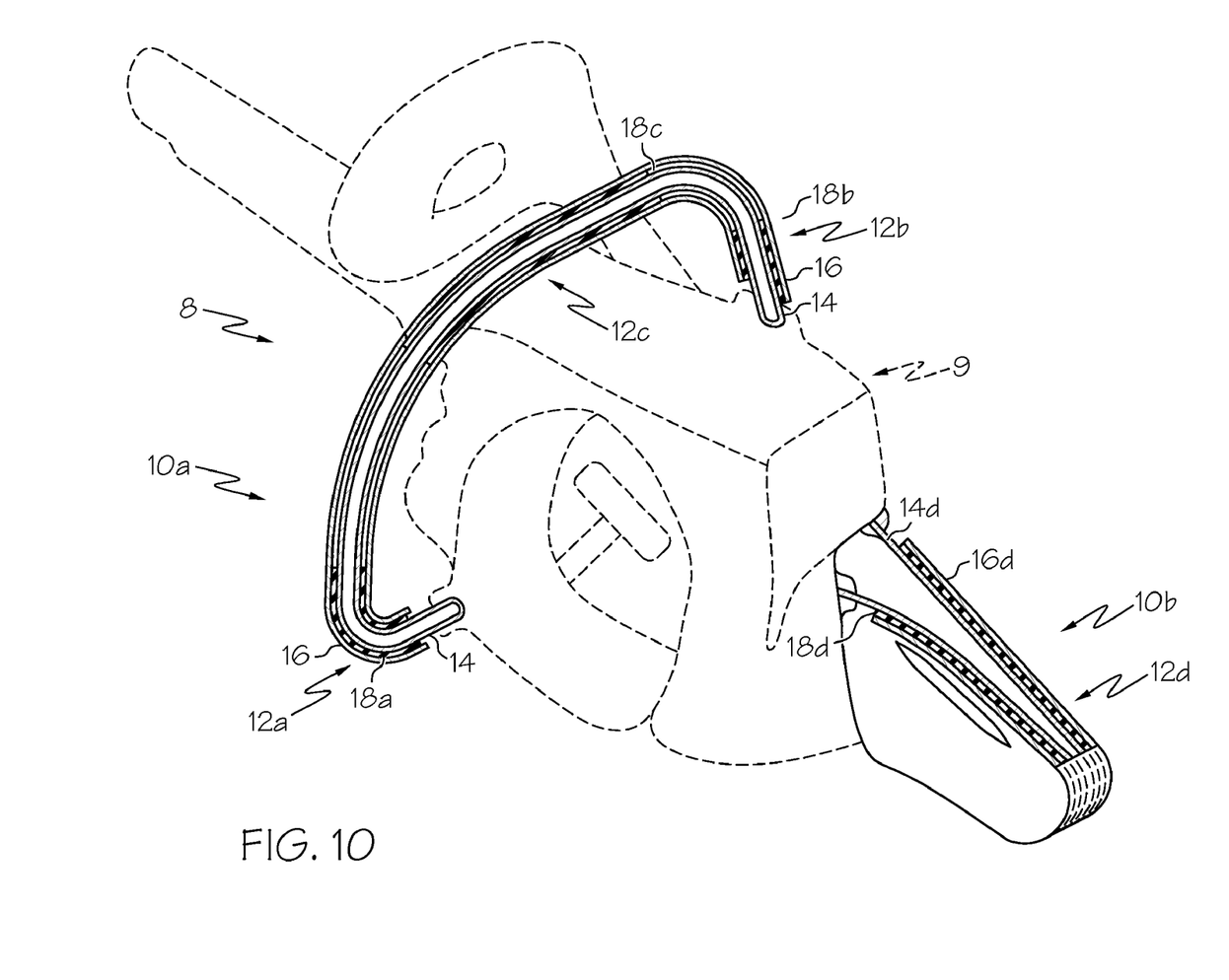
FIG. 10 is a perspective cross-sectional view of the handles of a chainsaw, each handle having a dampening portion.

In at least one embodiment, the dampening portion 12 has at least one bend or turn, as shown for example in FIG. 10.

Suitable materials for the first and second tubular members 14, 16 include, but are not limited to low carbon alloy steel, heat treated stainless steel, heat treated carbon steel, aluminum, aluminum alloys, titanium, heat treated titanium, titanium alloys, chrome molybdenum, magnesium alloys, plastics and any combination thereof. In at least one embodiment, the first and second tubes 14, 16 are made from the same material. In at least one embodiment, the first and second tubes 14, 16 are made from different materials.

The section of resilient material 18 can comprise any suitable material that provides appropriate damping between the tubes 14, 16 while also transmitting forces applied by an operator (e.g. pushing the handle of a mower). In some embodiments, a section of resilient material 18 can comprise at least one elastomer, such as a thermoset elastomer and/or a thermoplastic elastomer (TPE). In some embodiments, a section of resilient material 18 can comprise a viscoelastic material. In some embodiments, a section of resilient material 18 can comprise a block copolymer, including diblock, triblock, star block and random block copolymers. In some embodiments, a styrenic block copolymer such as styrene-butadiene-styrene (SBS), high diblock SBS, styrene-isoprene-styrene (SIS), styrene-ethylene/butylene-styrene (SEBS), oil back SEBS such as Kraton® G 1651, styrene-ethylene/propylene-styrene (SEPS) and various combinations thereof can be used. In some embodiments, non-elastomeric polymers such as polyesters can be suitable. Further examples of suitable elastomers include, but are not limited to, natural rubber, polyisoprene, polybutadiene, chloroprene rubber, polyurethane rubber, polysuflide rubber, silicone rubbers, resilin, polyurethane elastomers, polyether-ester block copolymers such as those sold under the tradename of Hytrel® and Arnitel®, and polyester-esters, polyether-block-amide copolymers such as Pebax®, and any combination thereof. In some embodiments, a section of resilient material 18 can comprise a polymer foam. In some embodiments, a foam can be made from one or more materials listed as suitable elastomers.

The particular material(s) used to form the resilient material 18 can depend upon the particular application of the device. For example, the glass transition temperature(s) of the material(s) are relevant to the operating conditions of the device. For example, if the device is generally used in cold weather, such as a snowblower, then a lower glass transition temperature is desirable, for example in the −20° F. to −40° F. range. If the device is generally used in hot weather, materials with relatively higher glass transition temperatures can be desirable.

It is within the scope of the invention for there to be one, two, three, four, five, six, seven, eight, nine, ten, eleven, twelve, thirteen, fourteen, sixteen, seventeen, eighteen, nineteen, twenty or more sections of the resilient material 18. In some embodiments, the section(s) of resilient material 18 reduces or dampens the vibrations transmitted to user from the vibrating device 8. In some embodiments, the section(s) of resilient material 18 is designed to transmit external loading forces between the first and second tubes 14, 16 (e.g. a person pushing on the handle of a lawnmower) while minimizing transmission of vibrations and other recurring oscillations between the tubes 14, 16. The amount of dampening depends upon the thickness of the section of resilient material 18 and the length (size) of the dampening portion 12. It is within the scope of the invention for the section of resilient material 18 to have any thickness. Note that the thickness of the section of resilient material 18 also affects the distance between the first and second tubes 14, 16.

The dampening portion 12 can have many different configurations. One configuration that the dampening portion 12 can have is shown in the cross-section of FIG. 2. Although the tubes 14, 16 illustrated in the figures have a substantially circular cross-sectional shape, it is within the scope of the invention for the tubes 14, 16 to have any cross-sectional shape. In some embodiments, the tubes 14, 16 have the same cross-sectional shape. In some embodiments, the first tube 14 can comprise different cross-sectional shape than the second tube 16.

Figure 2:
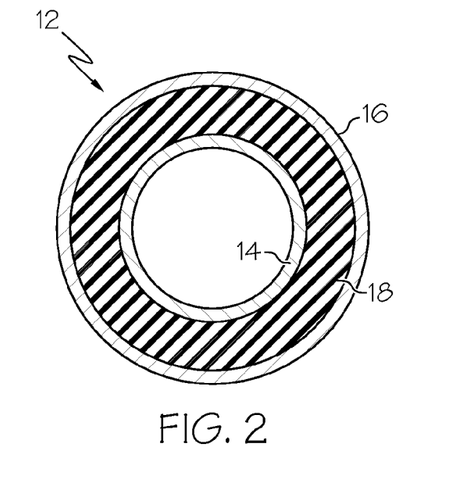
FIG. 2 is a cross-section of an embodiment of the dampening portion of the handle in FIG. 1 taken at line 2-2.

In FIG. 2, the section of resilient material 18 is a tube of resilient material 18 coaxially aligned with the first and second tubes 14, 16. In some embodiments, the tube of resilient material 18 has the same cross-sectional shape as the first tube 14 and/or the second tube 16. In at least one embodiment, the tube of resilient material 18 comprises at least one layer of resilient material 18. Thus, it is within the scope of the invention for the tube of resilient material 18 to be comprised of one, two, three, four, five, six or more layers of resilient material 18. In one embodiment, the section of resilient material 18 comprises a first layer of resilient material 18 and a second layer of resilient material 18 where the materials comprising the first and second layers are different. In some embodiments, various layers can be coaxially aligned.

Figure 3:
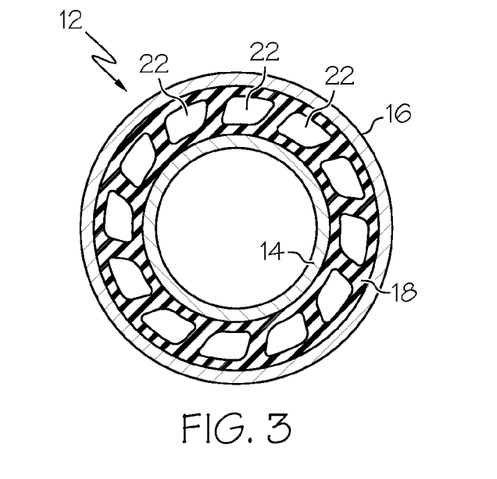
FIG. 3 is a cross-section of an alternative embodiment of the dampening portion of the handle in FIG. 1 taken at line 2-2 where the section of resilient material has at least one longitudinal passageway.

Instead of being a continuous or "solid" section of resilient material 18, in some embodiments, the section of resilient material 18 has at least one space or aperture 22 within the body of the section of resilient material 18, as shown in the cross-section of FIG. 3. In at least one embodiment, the apertures 22 contain air. The aperture 22 can have any cross-sectional shape, including, but not limited to, circular, diamond-shaped, triangular, square-shaped, rhomboidal, irregular-shaped and any combination thereof. It is within the scope of the invention for the aperture 22 to have any configuration, including but not limited to helical, circumferential, longitudinal and any combination thereof. In some embodiments, apertures 22 can comprise voids in the resilient material 18. In some embodiments, an aperture 22 can be completely bounded by resilient material 18. As shown in FIG. 3, in some embodiments, an aperture 22 can occupy a portion of a radial dimension of the resilient material. In some embodiments, an aperture 22 can extend along at least a portion of the longitudinal length of the section of resilient material 18.

Although the thickness of the aperture 22, in this embodiment, is less than the thickness of the section of resilient material 18, it is within the scope of the invention for the apertures 22 to have any length. In at least one embodiment, the length of the apertures 22 equals the length of the section of resilient material 18, i.e. the apertures 22 extend from one end of the section of resilient material 18 to the opposite end. In at least one embodiment, the length of at least one of the apertures 22 is less than the length of the section of resilient material 18, i.e. the aperture 22 is entirely contained within the body of the section of resilient material 18.

Figure 4:
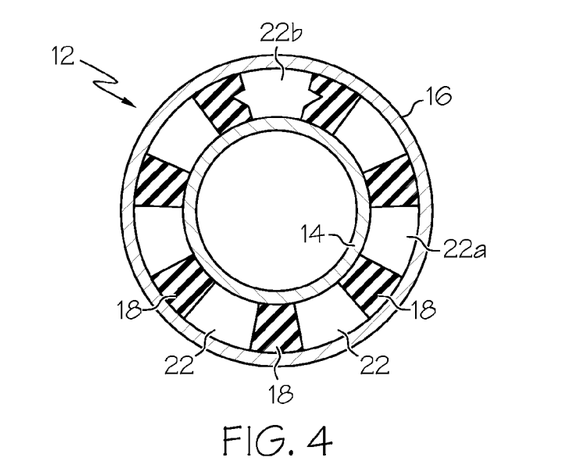
FIG. 4 is a cross-section of another embodiment of the dampening portion of the handle in FIG. 1 taken at line 2-2 where the dampening portion has a plurality of sections of resilient material.

In some embodiments, the dampening portion 12 has a plurality of spaced sections of resilient material 18. In some embodiments, the sections can be spaced in a circumferential direction around a tube 14, as shown in the cross-section of FIG. 4. The dampening portion 12 in FIG. 4 has seven sections of resilient material 18 arranged about the longitudinal axis of the dampening portion 12.

The dampening portion 12 can have any number of sections of resilient material 18 forming any configuration so long as there are apertures 22 between each section of resilient material 18. The apertures 22 in this embodiment extend from the inner tube to the outer tube of the dampening portion 12, i.e. the apertures 22 are not within the body of the section (s) of resilient material 18. Similar to the previous embodiment, the apertures 22 can have any configuration and cross-sectional shape. In this embodiment, both the sections of resilient material 22 and the apertures 22 extend along the longitudinal axis of the dampening portion 12. The cross-sectional shape of the apertures 22 in this embodiment depends in part on the shapes of the sections of resilient material 18 that define at least two sides of the aperture 22, as shown by comparing apertures 22a and 22b in FIG. 4. The sections of resilient material 18 can be made from the same material or different materials.

Figure 5:
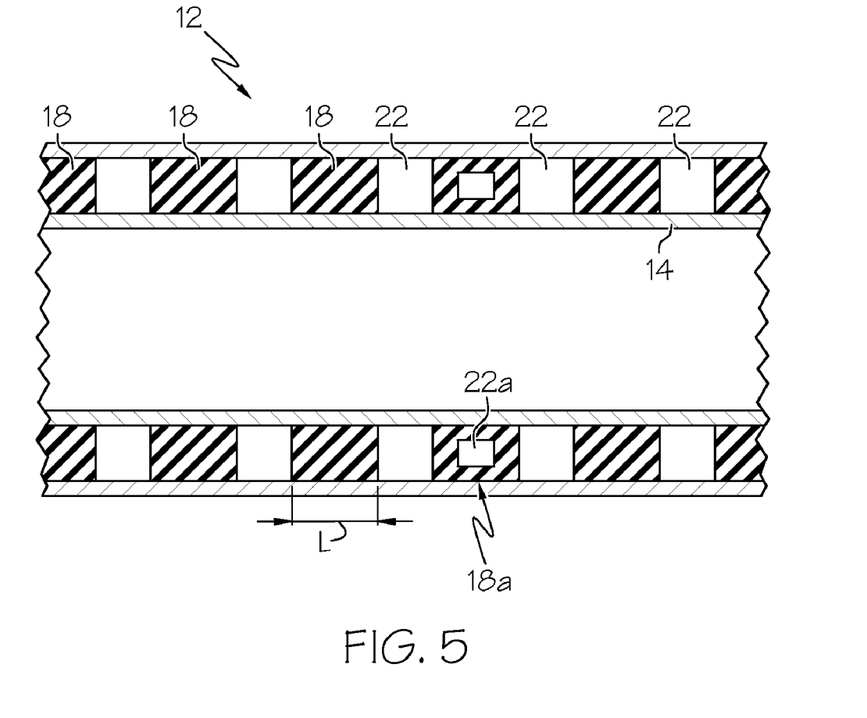
FIG. 5 is a longitudinal cross-section of an embodiment of the dampening portion of the handle in FIG. 1 taken at line 5-5 where the dampening portion has a plurality of circumferential sections of resilient material.

In some embodiments, the sections of resilient material 18 can be spaced along the length of the tubes 14, 16. In some embodiments, each section of spaced resilient material 18 extends continuously around a central axis, e.g. the longitudinal axis of the dampening portion 12. In at least one embodiment, the dampening portion 12 comprises at least one circumferential ring of resilient material 18, as shown in the longitudinal cross-section of FIG. 5. The dampening portion 12 in FIG. 5 has six circumferential rings of resilient material 18, with circumferential apertures 22 between each circumferential ring of resilient material 18. The circumferential rings of resilient material 18 can have any length (l), as measured along the longitudinal axis of the dampening portion 12. In at least one embodiment, the circumferential apertures 22a are defined by the sections of resilient material 18a, similar to the apertures 22 of FIG. 3. In this embodiment, the section of resilient material 18a is engaged to the entire length of the tubes 14, 16 of the dampening portion 12.

The parts of the dampening portion 12 can be engaged to one another by any means known in the art. In at least one embodiment, the section of resilient material 18 is engaged to at least one of the first and second tubes 14, 16 by an adhesive. In at least one embodiment the section of resilient material 18 is engaged to at least one of the first and second tubes 14, 16 by friction, discussed in greater detail below.

Figure 6:
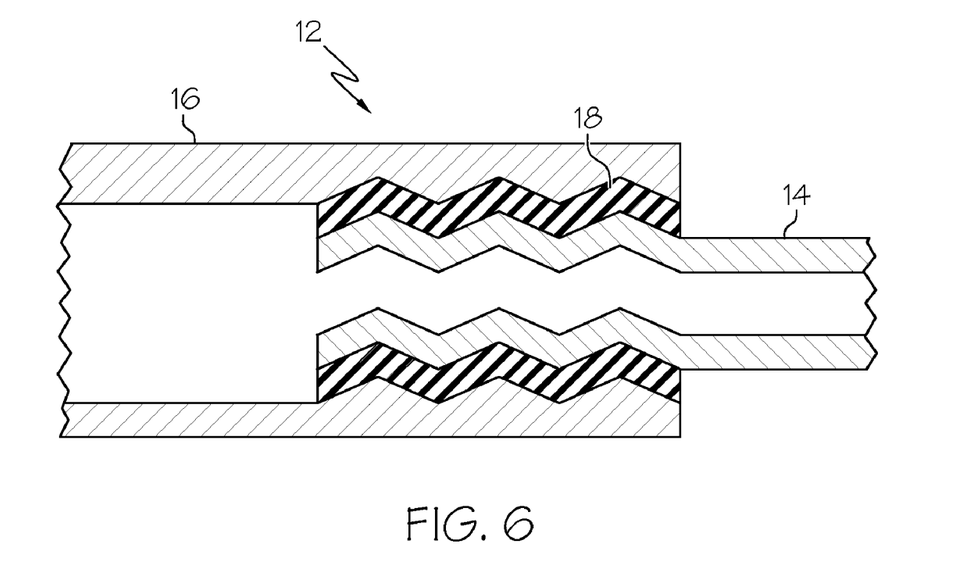
FIG. 6 is a longitudinal cross-section of an embodiment of the dampening portion of the handle in FIG. 1 taken at line 5-5 where the first and second tubes have complementary shapes to enhance engagement.
Figure 7:
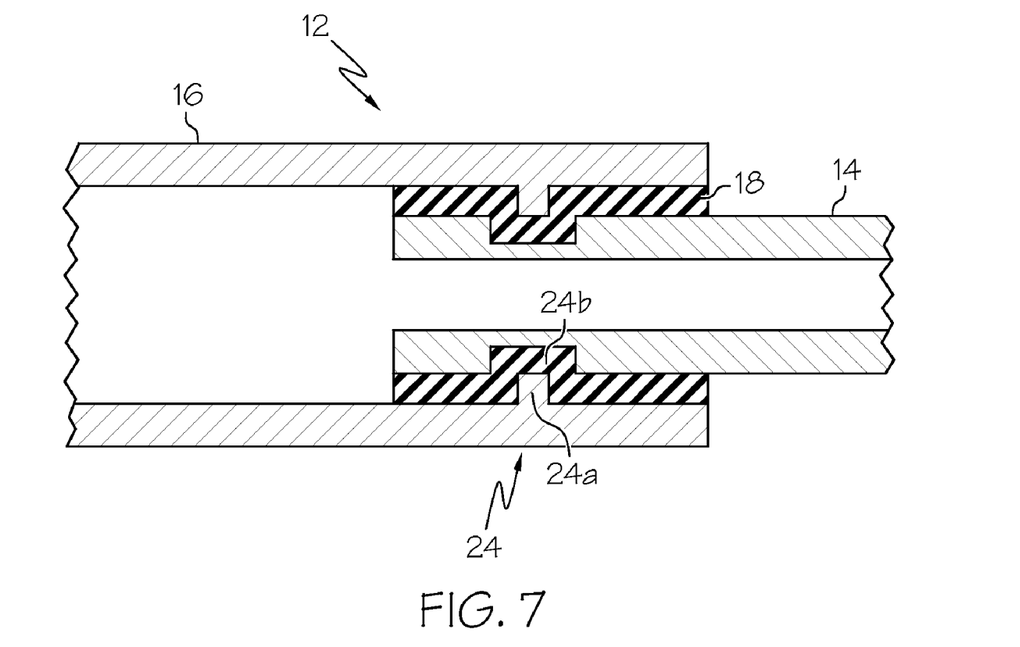
FIG. 7 is a longitudinal cross-section of the dampening portion of the handle in FIG. 1 taken at line 5-5 with a flange to enhance engagement.
Figure 8:
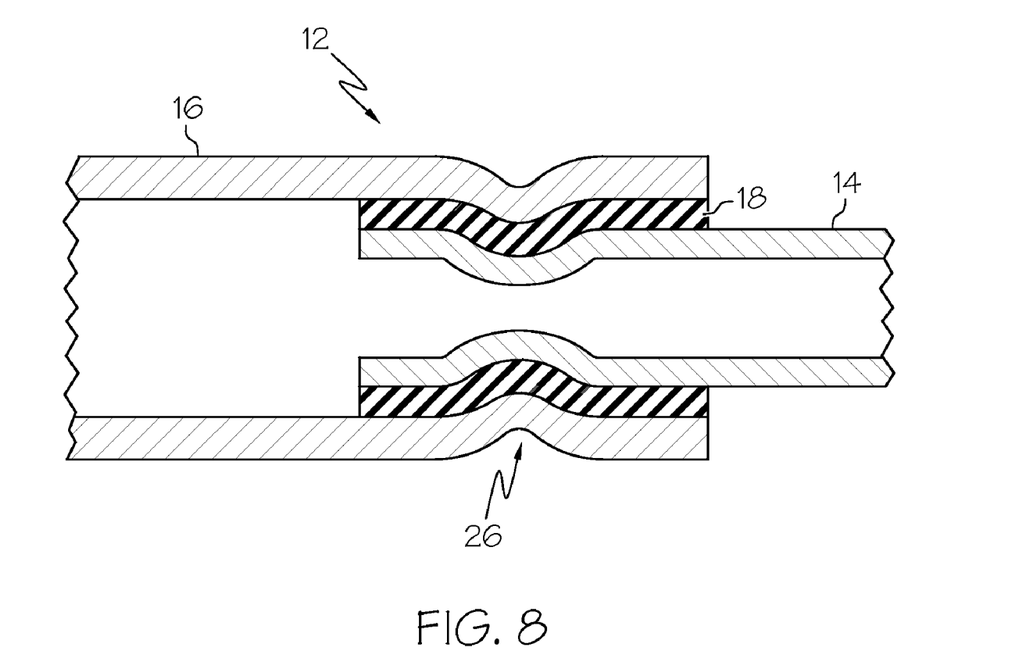
FIG. 8 is a longitudinal cross-section of the dampening portion of the handle in FIG. 1 taken at line 5-5 which has been crimped to enhance engagement.

Alternatively, the structure of the dampening portion 12 is configured to engage the parts 14, 16, 18 of the dampening portion 12 to one another, as shown in FIGS. 6-8. In each of the embodiments shown in FIGS. 6-8, the outer surface of a section of resilient material 18 has a complementary shape to the inner surface of the outer tube 16 and the inner surface of the section of resilient material 18 has a complementary shape to the outer surface of the inner tube 14. Similarly, the inner surface of the outer tube 16 has a complementary shape to the outer surface of the inner tube 14.

In FIG. 6, the first and second tubes 14, 16 and the section of resilient material 18 have complementary shapes that minimize longitudinal movement of the parts 14, 16, 18 of the dampening portion 12 relative to one another. In this embodiment, a portion of both the first and second tubes 14, 16 have complementary zig-zag shapes, but the tubes 14, 16 can have any complementary shape. In one embodiment, adhesive is used in addition to the complementary shape to engage the parts 14, 16, 18 of the dampening portion 12 to one another.

In at least one embodiment, the dampening portion 12 has at least one tongue and groove 24. The dampening portion 12 in FIG. 7 has one tongue and groove 24 that engages the parts 14, 16, 18 of the dampening portion 12 together. It is within the scope of the invention for the dampening portion 12 to have one, two, three, four, five, six, seven, eight, nine, ten or more tongue and grooves 24. In FIG. 7, the second tube 16 has the tongue 24a and the first tube 14 has the groove 24b, but either tube 14, 16 can have the tongue 24a or groove 24b. If a dampening portion 12 has more than one tongue and groove 14, the first tube 14 can have the first tongue 24a and the second tube 16 can have the second tongue 24a. Note that the tongue 24a of the second tube 16 is smaller than the groove 24b in the first tube 14 because the section of resilient material 18 covers the tongue 24a of the second tube 16. Thus, the tongue 24a covered with resilient material 18 is sized so that it fits into the groove 24b of the first tube 14.

In at least one embodiment, the dampening portion 12 is crimped to engage the parts 14, 16, 18 of the dampening portion 12 after the parts 14, 16, 18 have been coaxially aligned. The dampening portion 12 can be crimped by any means known in the art.

Figure 9A:
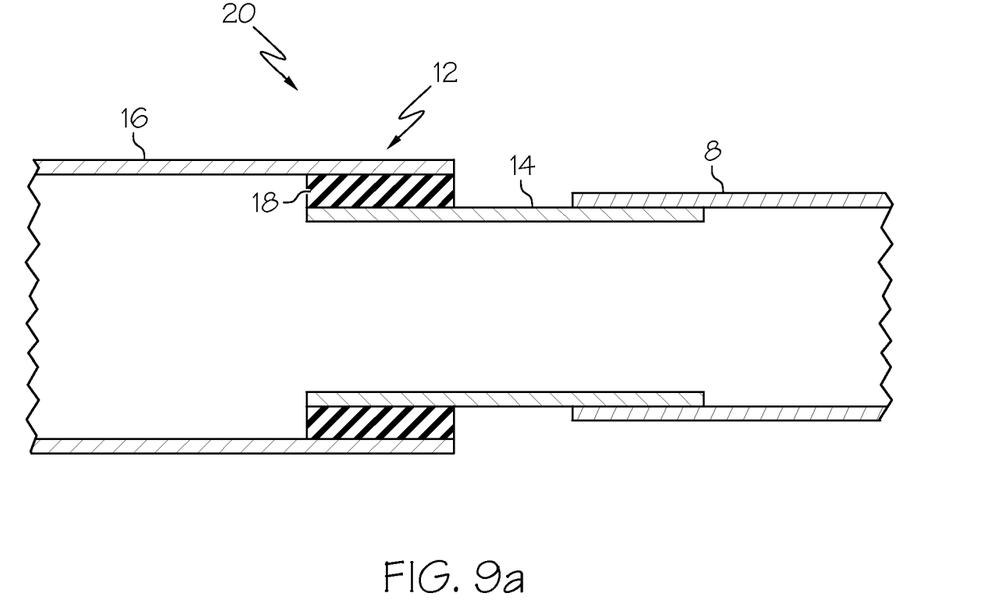
FIG. 9a is a longitudinal cross-section of a portion of a device with the dampening portion adjacent to an attachment region.
Figure 9B:
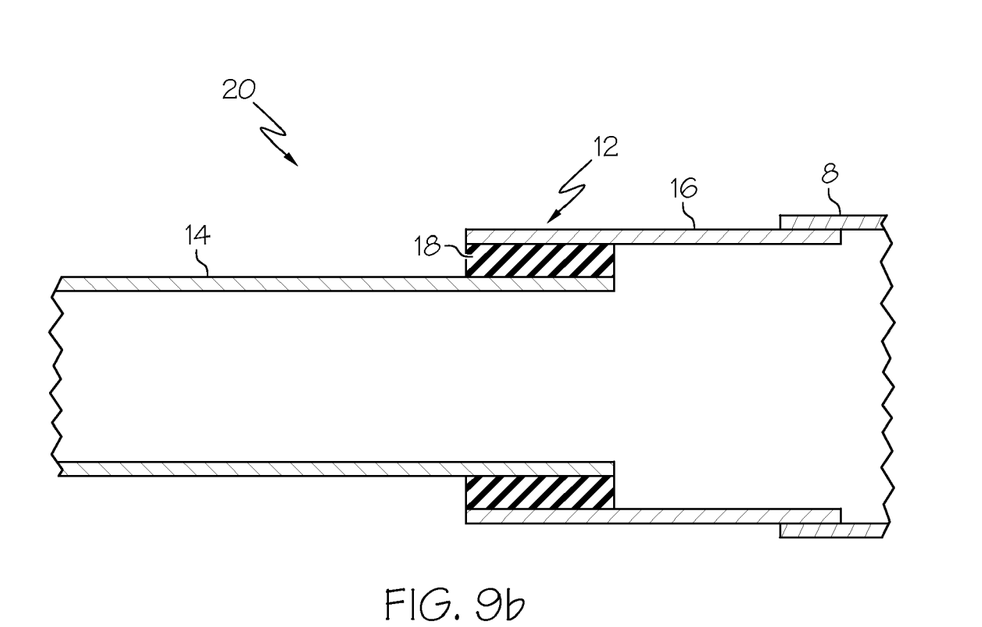
FIG. 9b is a longitudinal cross-section of a portion of a device with the dampening portion adjacent to an attachment region.

In at least one embodiment, at least a portion of at least one of the first and second tubes 14, 16 is engaged to another part of the device 8, as shown in FIGS. 9a and b. The tube(s) 14, 16 can be engaged to the device 8 by any means known in the art. In FIG. 9a, the distal end region of the first tube 14 is engaged to the device 8 and the proximal end region of the first tube 14 forms a part of the dampening portion 12. In FIG. 9b, the proximal end region of the second tube 16 is engaged to the device 8 and the distal end region of the second tube 16 forms the dampening portion 12. Although not illustrated in FIGS. 9a and b, it is within the scope of the invention for the first and second tubes 14, 16 to be coaxially aligned beyond the dampening portion 12. Thus, in FIG. 9a, the first tube 14 can extend in a proximal direction from the dampening portion 12 and in FIG. 9b, the second tube 16 can extend in a proximal direction beyond the dampening portion 12.

FIG. 10 is a chainsaw that has at least one dampening portion 12. To simplify the drawing, the body 9 of the chainsaw is drawn with dashed lines to emphasize the handles 10 of the chainsaw, which are drawn with solid lines. The chainsaw in FIG. 10 has two handles 10a,b, each of which has at least one dampening portion 12. In at least one embodiment, only one of the two handles 10a or 10b has a dampening portion 12.

In this embodiment, the first handle 10a of the chainsaw has three dampening portions 12a,b,c. Both ends of the first tube 14 of the first handle 10a are engaged to the body 9 of the chainsaw. The second tube 16 is not directly engaged to the body 9 of the chainsaw but is engaged to the first tube 14 by the sections of resilient material 18a,b,c. Thus, the second tube 16 is indirectly engaged to the body 9 of the chainsaw. In this embodiment, the user would hold the exterior surface of the second tube 16. In at least one embodiment, the section of resilient material 18 extends along the length of the second tube 16, so that the dampening portion 12 extends almost the entire length of the handle 10.

The second handle 10b of the chainsaw has one dampening portion 12d that extends along the upper portion of the handle 10b, where the user's hand would grip the second handle 10b.

Similar to the first handle 10*a*, both ends of the first tube 14*d* are engaged to the body 9 of the chainsaw. The second tube 16*d* is not engaged to the body 9 of the chainsaw but is engaged to the first tube 14*d* by a section of resilient material 18*d*. Thus, the second tube 16 is indirectly engaged to the body 9 of the chainsaw. In this embodiment, the user would hold the exterior surface of the second tube 16.

Figure 11:
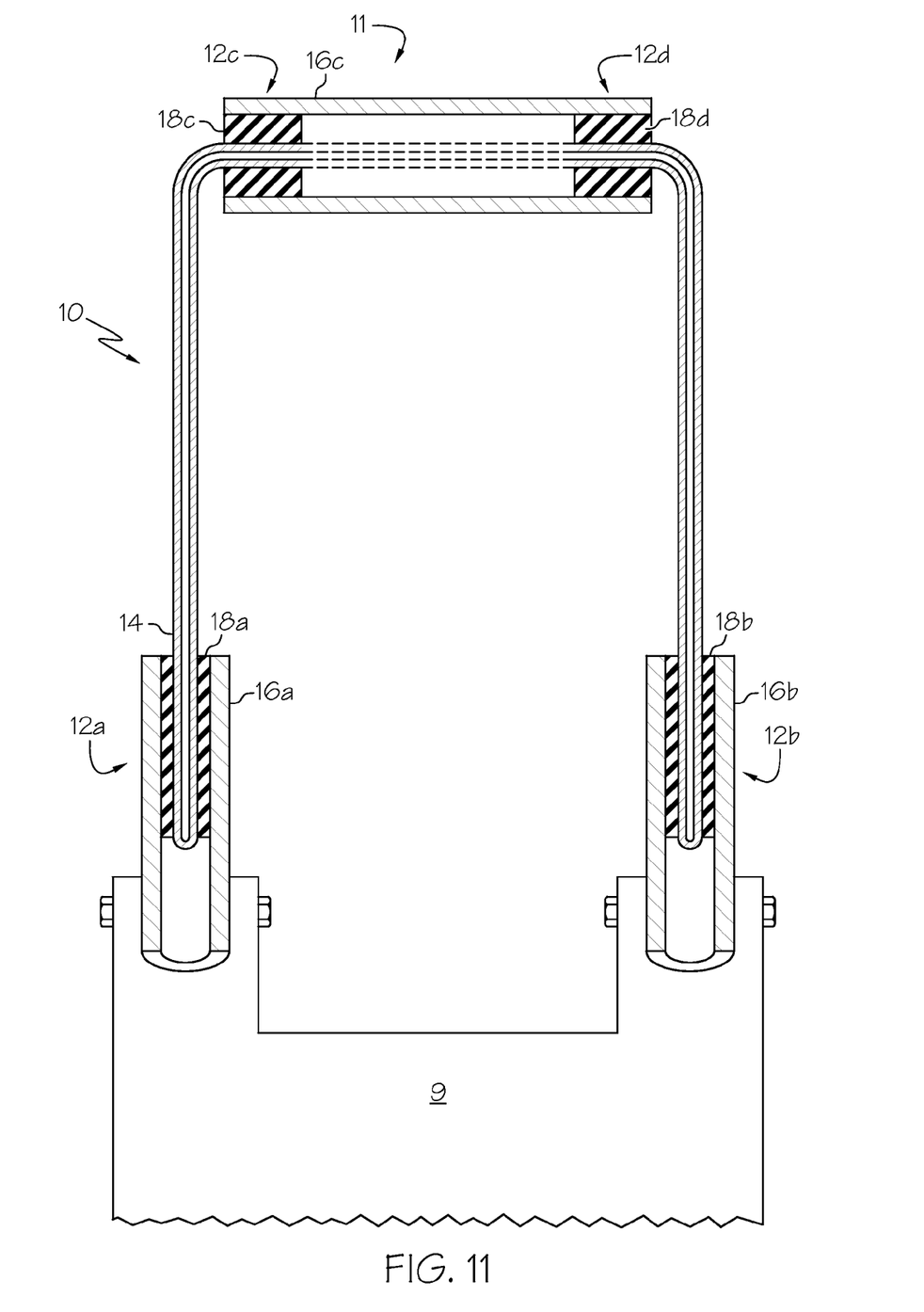
FIG. 11 is a top cross-sectional view of a lawn mower with at least one dampening portion.

FIG. 11 is a top view of a push lawn-mower 8 with a cross-sectional view of the handle 10. The lawnmower 8 has four dampening portions 12*a,b,c,d*. Two of the dampening portions 12*a,b* are adjacent to where the handle 10 is engaged to the body 9 of the lawnmower 8. In this embodiment, the handle 10 comprises the first tube 14. The first tube 14 is engaged to the body 9 of the lawnmower 8 via one or more second tube(s) 16*a*/16*b*, which extend beyond the end of the first tube 14 and engage the body 9 of the lawnmower 8. Thus, the first tube 14 is indirectly engaged to the body 9 of the lawnmower. A portion of the second tube 16*a*/16*b* extending from the body 9 of the lawnmower 8 comprises a part of the dampening portion 12*a/b* where the second tube 16*a*/16*b* is coaxially aligned with the first tube 14 and at least one section of resilient material 18 is positioned between the second tube 16*a*/16*b* and the first tube 14.

In some embodiments, the horizontal portion 11 of the handle 10 comprises two dampening portions 12*c* and 12*d*. In some embodiments, the two dampening portions 12*c* and 12*d* can be positioned where the user's hands would grip the handle 10. Each dampening portion 12*c/d* has a second tube 16*c* coaxially aligned with the first tube 14 and at least one section of resilient material 18*c/d*. The sections of resilient material 18 can be two discrete or non-continuous sections 18*c/d*, as shown in FIG. 11, or the section of resilient material 18 can extend the entire length of the second tube 16. In some embodiments, only the proximal and distal portions of the second tube 16*c* are coaxially aligned with the first tube 14, as shown in FIG. 11. In this embodiment, the middle section of the second tube 16*c* is hollow. In other embodiments, the entire length of the second tube 16 is coaxially aligned with the first tube 14, shown in FIG. 11 with dashed lines extending between the dampening portions 12*c* and 12*d*.

Figure 12:
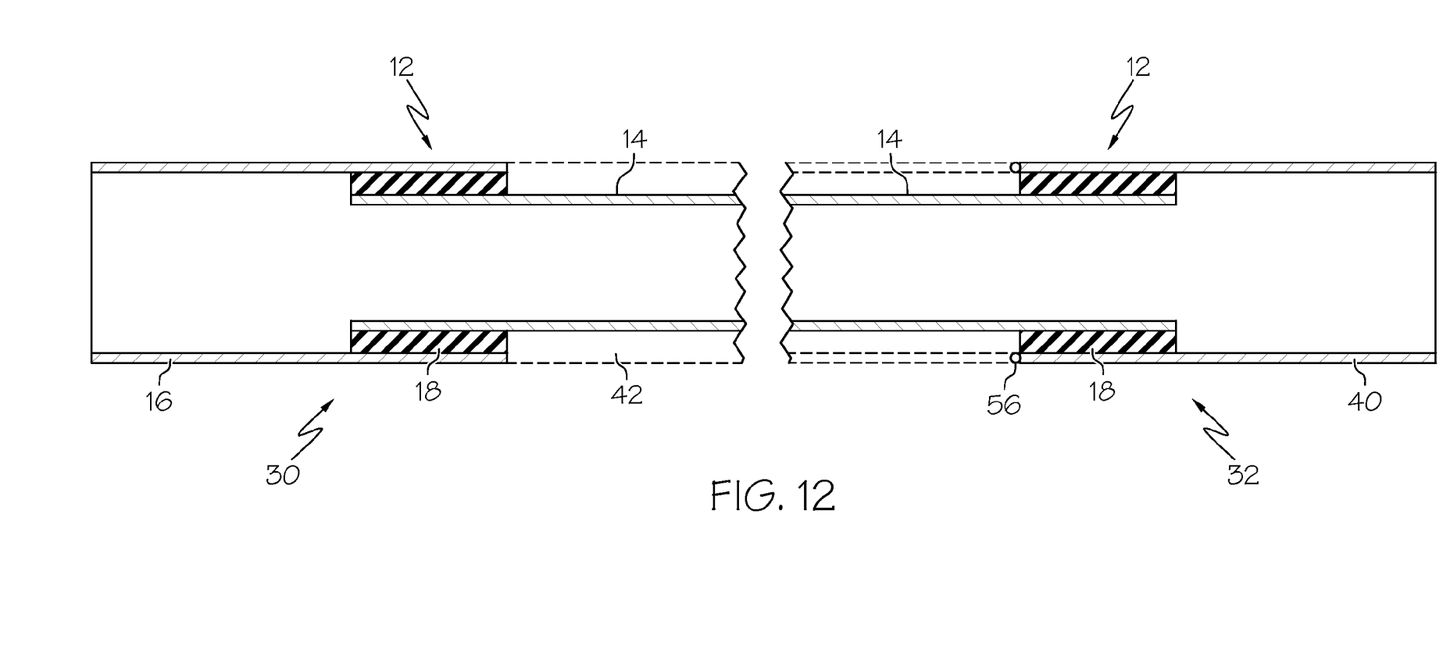
FIG. 12 shows a cross-sectional view of an embodiment of a tubular device, such as a drumstick.

FIG. 12 shows a cross-sectional view of a device such as a drumstick. FIG. 12 shows the end portions of the device and omits a central length portion of the device. Two dampening portions 12 are shown, each associated with an end 30, 32 of the device. A first tube 14 extends between the dampening portions 12. At either end of the first tube 14, resilient material 18 is disposed about at least a portion of the first tube 14. A second tube 16 is disposed about the resilient material 18 associated with the first end 30 of the device. The second tube 16 extends longitudinally outward beyond the resilient material 18 and comprises a handle for the device. A third tube 40 is disposed about the resilient material 18 associated with the second end 32 of the device. The third tube 40 extends longitudinally outward beyond the resilient material 18 and comprises a handle for the device. In some embodiments, the drumstick can further comprise a filler material 42 disposed about the first tube 14 in locations between the dampening portions 12, which can give the device an even cylindrical shape. In some embodiments, the filler 42 can comprise a tube 50 that is similar in appearance to the second tube 16 and/or the third tube 40. When a filler tube 50 is used, a soft bushing 56 can be desirable to help prevent vibrations from transferring between the filler tube 50 and the other outer tubes 15, 40. In some other embodiments, one end 30, 32 of the device can alternatively taper to a tip. For example, the third tube 40 could alternatively taper to a tip.

Dampening portions 12 can be located anywhere on a device 8. For example, FIG. 15 of US Application Publication No. 2005/0279598, entitled Harmonic Damper, illustrates different positions on a bicycle where a dampening portion 12 can be positioned. It is within the scope of the invention for the device 8 to have one, two, three, four, five, six, seven, eight, nine, ten or more dampening portions 12. The examples discussed herein are non-limiting examples of locations on a device 8 that may have a dampening portion 12, other locations on the device 8 may also have a dampening portion 12. Each device 8 is different and the location of the dampening portion(s) 12 on the device 8 can be tailored to the specific device 8. In at least one embodiment, the dampening portion 12 is positioned near an engagement of one part of the device 8 to another part of the device 8, as shown for example in FIGS. 9*a*, 9*b*, and 10.

Figure 1:
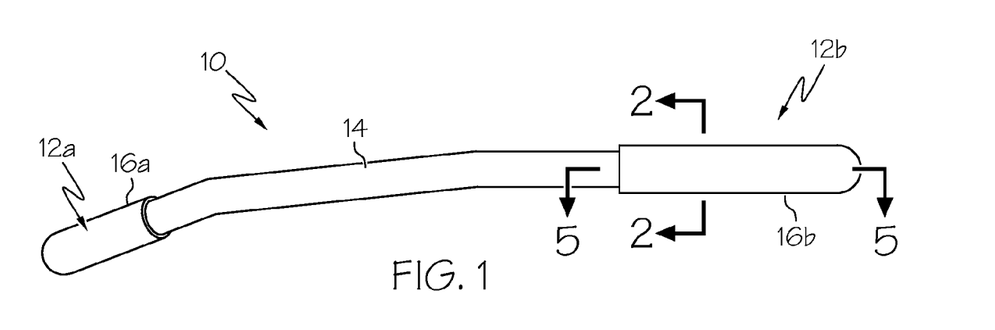
FIG. 1 is a side view of a bicycle handle with two dampening portions.

In at least one embodiment, the dampening portion 12 forms the part of the device 8 that is held by the user's hand(s), as shown in FIGS. 1, 10 and 11. Thus, the dampening portion 12 may be the handle(s) 10 of the device 8 or a portion of the handle(s) 10 of the device 8. For example, the bicycle handle in FIG. 1 has two dampening portions 12*a,b*, positioned where the hands grip the handle 10. For simplicity, only the handle 10 of the bicycle is shown. As shown in FIG. 1, the first tube 14 extends the entire length of the handle 10 and the second tubes 16*a,b* are at both ends of the first tube 14. Similarly, because the resilient layer 18 is between the first and second tubes 14, 16, the resilient layer 18 is positioned at the two ends of the handle 10, where the second tube 16 encircles the first tube 14. In at least one embodiment, the second tube 16 and the resilient layer 18 extend the entire length of the handle 10. In this embodiment, the dampening portion 12 is the handle 10.

The invention is also directed to methods of making the dampening portion 12 of a device 8. In at least one embodiment, the first tube 14 is coated with a layer 18 of resilient material. Then the first tube 14 with the resilient layer 18 engaged thereto is coaxially oriented within the second tube 16. Once the second tube 16 is disposed about the first tube 14 and resilient layer 18, the first tube 14 is expanded so that the second tube 16 is engaged to the resilient layer 18, thereby forming the dampening portion 12. The first tube 14 can be expanded by any suitable means. Non-limiting examples of methods to expand the first tube 14 include expanding the inner tube 14 with hydraulic pressure or by pulling a ball or other suitable object through the inner tube 14, thereby causing expansion of the inner tube 14. In one embodiment, the resilient layer 18 has a layer of adhesive so that after the first tube 14 is expanded, the second tube 14 is adhesively engaged to the resilient layer 18/first tube 14. In one embodiment, the second tube 16 is frictionally engaged to the resilient layer 18/first tube 14.

In some embodiments, the outer tube 16 can initially comprise a semi-circular cross-sectional shape, which allows for the tube to be crimped or otherwise be reduced in diameter. For example, an outer tube can be provided that comprises a c-shaped cross-section. The inner tube and the resilient material can be appropriately oriented with the outer tube, and the outer tube can be reduced in size, thus securing the damper.

In some embodiments, the inner tube 14 can initially be provided with a slit, which allows for the tube to be expanded with less force than a closed tubular member. Thus, a slit inner tube can be appropriately oriented with resilient material and the outer tube, and the slit inner tube can be expanded.

In at least one embodiment, once the first tube 14 is coated with the resilient layer 18, the first tube 14 is cooled while the second tube 16 is heated. The second tube 16 is then coaxially aligned with the first tube 14. In one embodiment, once the two tubes 14, 16 reach equilibrium temperature, the second tube 16 is frictionally engaged to the first tube 14/resilient layer 18. In one embodiment, the resilient layer 18 has a layer of adhesive so that once the two tubes 14, 16 reach equilibrium temperature, the second tube 16 is adhesively engaged to the resilient layer 18/first tube 14.

With both methods of manufacture, the first tube 14 can have an unexpanded outer diameter and an expanded outer diameter, where the expanded outer diameter is greater than the unexpanded outer diameter and both the unexpanded and expanded outer diameters are smaller than the inner diameter of the second tube 14. Similarly, the outer diameter of the first tube 14 with the resilient layer 18 engaged thereto must be smaller than the inner diameter of the second tube 16 so that the second tube 16 can be disposed about the first tube 14/resilient layer 18.

Examples of adhesives include, but are not necessarily limited to, the use of thermoplastic, water-based, reactive chemistries and solvent based adhesives. Thermoplastic adhesives may be based on polymers including, but not limited to, polyolefin's, including polyethylene and polypropylene, polyamides, polyurethanes, polyesters, polyacrylates, elastomeric block co-polymers, and any co-polymers axed terpolymers thereof. Ethylene vinyl acetate, ethylene methyl acrylate, ethylene-n-butyl acrylate, and so forth, are commonly employed copolymers of ethylene, and homopolymers of ethylene and propylene are commonly employed in thermoplastic adhesives as well. Another class or ethylene copolymers include those referred to in the art as interpolymers of ethylene having at least one C3 to C2O alphaolefin.

Thermoplastic pressure sensitive adhesives may also find utility herein and commonly incorporate rubbery block copolymers such as the styrenic block copolymers including, but not limited to, styrene-isoprene-styrene (SIS), styrene-butadiene-styrene (SBS), styrene-ethylene/propylene-styrene (SEPS), styrene-ethylene/butylene-styrene (SEBS), styrene-isobutylene-styrene (SIBS), and so forth.

Thermoplastic adhesive compositions may suitably also include tackifying resins, plasticizers, oils, waxes, antioxidants, and any combination thereof, as well as other additives known to those of skill in the art.

Water based pressure sensitive adhesives may also find utility herein. Such adhesives commonly incorporate polyacrylic polymers such as styrene-acrylic copolymer, vinyl-acrylic, vinyl ester/vinyl acetate/acrylic; ethylene vinyl acetates, polyurethanes; polyurethane-acrylic hybrids; polyanudes; styrene-butadiene rubbers; polychloroprenes; acrylonitrile-butadiene-styrene; polyisoprenes; polyisobutylene; polyurea; natural latex; polysaccharides; gum resins; polyvinyl alcohols; and combinations thereof.

Thermoset adhesives which are cured by heat, chemical reaction and/or irradiation, may also be employed herein. There are a variety of thermoset adhesives including heat curing, moisture curing and UV curing, for example. Many such adhesives also come in one and two-part formulations.

UV curable adhesive compositions may be employed herein. Suitable UV curable compounds include those having (meth)acrylate functionality such as epoxy (meth)acrylates, urethane (meth)acrylates, polyester (meth)acrylates, acrylic (meth)acrylates, and so forth.

Moisture curable compositions may be employed herein. Examples of suitable moisture cures include polyurethanes and polyorganosiloxanes.

In addition examples of suitable two-component curing systems may include epoxies, polyurethanes, acrylics, and so forth.

The following numbered statements characterize embodiments described above:

1. A method of forming a dampening portion of a device comprising:
   providing a first tube;
   providing a resilient material;
   coating at least a portion of the first tube with a layer of the resilient material;
   providing a second tube;
   coaxially aligning the second tube about the first tube, the second tube being disposed about the at least a portion of the first tube coated with the layer of resilient material; and
   engaging the second tube to the at least a portion of the first tube coated with the layer of resilient material.

2. The method of statement 1, the layer of resilient material having an adhesive deposited thereon, the second tube being engaged by the adhesive.

3. The method of statement 1, the second tube being frictionally engaged to the at least a portion of the first tube coated with the layer of resilient material.

4. The method of statement 1, the second tube being engaged to the at least a portion of the first tube coated with the layer of resilient material by expanding the first tube.

5. The method of statement 4, the first tube being expanded by pressure.

6. The method of statement 5, the pressure being hydraulic pressure.

7. The method of statement 5, the pressure being supplied by pulling an object through the inner tube.

8. The method of statement 1, further comprising the steps of cooling the first tube coated with resilient material and heating the second tube before coaxially aligning the second tube about the first tube.

9. A method comprising:
   providing a first tubular member;
   providing a resilient material;
   providing a second tubular member;
   orienting a portion of the first tubular member coaxially around a portion of the second tubular member, the resilient material positioned between the coaxially oriented tubular members; and
   securing the first tubular member, resilient material and second tubular material to one another.

10. The method of statement 9, wherein securing comprises crimping the first tubular member.

11. The method of statement 9, wherein securing comprises reducing the size of at least a portion of the first tubular member.

12. The method of statement 9, wherein securing comprises increasing the size of at least a portion of the second tubular member.

13. The method of statement 9, wherein securing comprises heating the first tubular member to cause thermal expansion prior to orientation and cooling the first tubular member subsequent to orientation.

14. The method of statement 13, wherein securing further comprises cooling the second tubular member to cause thermal contraction prior to orientation.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the invention. Those skilled in the art may recognize other equivalents to the specific embodiment described herein which equivalents are intended to be encompassed by the claims attached hereto.

The invention claimed is:

1. A damper comprising:
    a first tubular member;
    a second tubular member, at least a portion of the second tubular member oriented coaxially with a portion of the first tubular member;
    a first section of resilient material positioned between the first tubular member and the second tubular member;
    a third tubular member, at least a portion of the third tubular member oriented coaxially with a portion of the second tubular member; and
    a second section of resilient material positioned between the second tubular member and the third tubular member;
    wherein the first tubular member either comprises a body of a device or is attached to a body of a device and the third tubular member either comprises the body of the device or is attached to the body of the device; and
    the second tubular member comprises a handle for the device.

2. The damper of claim 1, the at least one of said sections of resilient material comprising multiple apertures.

3. The damper of claim 2, the resilient material that comprises said multiple apertures comprising a first section and a second section, the first section of resilient material having a proximal edge with a longitudinal position, the second section of resilient material having a distal edge with a longitudinal position, the longitudinal position of the proximal edge being different than the longitudinal position of the distal edge, the at least one aperture being between the proximal edge of the first section of resilient material and the distal edge of the second section of resilient material.

4. The damper of claim 3, wherein the first section of resilient material comprises a material that is different from the second section of resilient material.

5. The damper of claim 2, said apertures being completely bounded by the resilient material.

6. The damper of claim 1, wherein the at least one of said sections of resilient material comprises a tube.

7. The damper of claim 6, wherein the tube of resilient material is oriented coaxially with the first tubular member.

8. The damper of claim 1, wherein a central axis of said first tubular member is offset from a central axis of said third tubular member.

9. The damper of claim 8, wherein the central axis of said first tubular member is parallel to the central axis of said third tubular member.

10. The damper of claim 1, a first portion of the first tubular member having a first cross-sectional shape, a first portion of the second tubular member having a second cross-sectional shape, the first cross-sectional shape complementary to the second cross-sectional shape, the first portions of the first and second tubular members oriented coaxially.

11. The damper of claim 10, the first cross-sectional shape being a tongue and the second cross-sectional shape being a groove.

12. The damper of claim 1, further comprising a fourth tubular member, at least a portion of the fourth tubular member oriented coaxially with said second tubular member; and
    a third section of resilient material positioned between the second tubular member and the fourth tubular member;
    wherein said fourth tubular member comprises a handle for the device.

13. The damper of claim 12, further comprising a fourth section of resilient material positioned between the second tubular member and the fourth tubular member.

14. The damper of claim 1, wherein the first tubular member attaches to the body at a location that is offset from the at least one section of resilient material along the length of the first tubular member.

15. The damper of claim 1, wherein the second tubular member comprises a first length portion and a second length portion, the first length portion oriented coaxially with the first tubular member and being coextensive with at least a portion of said first tubular member, the second length portion comprising the handle, the second length portion not coextensive with said first tubular member.

16. The damper of claim 1, the resilient material comprising at least one material selected from a group consisting of natural rubber, polyisoprene, polybutadiene, chloroprene rubber, polyurethane rubber, polysuflide rubber, silicone rubbers, resilin, thermoplastic elastomers (TPE) and any combination thereof.

17. The damper of claim 1, wherein at least one of said sections of resilient material comprises a plurality of spaced sections of resilient material positioned between the coaxially oriented tubular members.

18. The damper of claim 1, wherein said damper comprises a crimp connecting two of said coaxially oriented tubular members.

19. The damper of claim 1, wherein two of said coaxially oriented tubular members comprise complimentary zig-zag shapes.

20. The damper of claim 1, wherein the first tube extends outward beyond the first section of resilient material in a first direction, and the second tube extends outward beyond the first section of resilient material in a second direction.

21. The damper of claim 1, wherein the first tube and the second tube comprise a similar material.

22. A damper comprising:
    a first tubular member;
    a second tubular member comprising a first length portion and a second length portion, the first length portion oriented coaxially and coextensively with a portion of the first tubular member, the second length portion not coextensive with said first tubular member;
    a first section of resilient material positioned between the first tubular member and the second tubular member;
    a third tubular member, at least a portion of the third tubular member oriented coaxially with the first tubular member; and a second section of resilient material positioned between the first tubular member and the second tubular member; wherein the first tubular member comprises a body of a device and said second tubular member and said third tubular member comprise ends of the device; and the second length portion of the second tubular member comprises a handle for the device.

* * * * *